(12) United States Patent
Hohmuth et al.

(10) Patent No.: US 8,195,917 B2
(45) Date of Patent: Jun. 5, 2012

(54) EXTENDED PAGE SIZE USING AGGREGATED SMALL PAGES

(75) Inventors: Michael P. Hohmuth, Dresden (DE);
Uwe M. Dannowski, Moritzburg (DE);
Sebastian Biemueller, Dresden (DE);
David S. Christie, Austin, TX (US);
Stephan Diestelhorst, Dresden (DE);
Thomas Friebel, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 420 days.

(21) Appl. No.: 12/496,335

(22) Filed: Jul. 1, 2009

(65) Prior Publication Data
US 2011/0004739 A1 Jan. 6, 2011

(51) Int. Cl.
*G06F 12/10* (2006.01)
(52) U.S. Cl. .......................... 711/207; 711/206; 711/209
(58) Field of Classification Search .................. 711/206, 711/207, 209
See application file for complete search history.

(56) References Cited

U.S. PATENT DOCUMENTS

| | | | |
|---|---|---|---|
| 6,112,285 A | 8/2000 | Ganapathy et al. | |
| 7,437,529 B2 * | 10/2008 | Burugula et al. | 711/171 |
| 7,747,838 B2 * | 6/2010 | Hepkin et al. | 711/209 |
| 7,793,070 B2 * | 9/2010 | Stecher | 711/207 |
| 7,873,792 B2 * | 1/2011 | Anand et al. | 711/137 |
| 2004/0117594 A1 * | 6/2004 | VanderSpek | 711/209 |
| 2006/0069899 A1 * | 3/2006 | Schoinas et al. | 711/206 |
| 2006/0075146 A1 * | 4/2006 | Schoinas et al. | 710/3 |
| 2006/0174053 A1 | 8/2006 | Anderson et al. | |
| 2007/0067604 A1 | 3/2007 | Elnozahy et al. | |
| 2007/0180215 A1 | 8/2007 | Cascaval et al. | |
| 2008/0288742 A1 | 11/2008 | Hepkin et al. | |
| 2009/0013149 A1 * | 1/2009 | Uhlig et al. | 711/207 |
| 2009/0019254 A1 * | 1/2009 | Stecher | 711/207 |
| 2009/0172344 A1 * | 7/2009 | Grochowski et al. | 711/207 |
| 2011/0055458 A1 * | 3/2011 | Kuehne | 711/103 |

OTHER PUBLICATIONS

International Search Report and Written Opinion in application serial No. PCT/US10/40625 issued Aug. 30, 2010.
Lim, et al: "Disaggregated Memory for Expansion and Sharing in Blade Servers"; AMC SIGARCH Computer Architecture News [online], vol. 37, No. 3, pp. 267-278; Jun. 2009; http://www.eecs.umich.edu/-twenisch/papers/Isca09-disaggregate.pdf.

* cited by examiner

*Primary Examiner* — John Lane
(74) *Attorney, Agent, or Firm* — Rory D. Rankin; Meyertons, Hood, Kivlin, Kowert & Goetzel (57) ABSTRACT

A processor including a virtual memory paging mechanism. The virtual memory paging mechanism enables an operating system operating on the processor to use pages of a first size and a second size, the second size being greater than the first size. The mechanism further enables the operating system to use superpages including two or more contiguous pages of the first size. The size of a superpage is less than the second size. The processor further includes a page table having a separate entry for each of the pages included in each superpage. The operating system accesses each superpage using a single virtual address. The mechanism interprets a single entry in a translation lookaside buffer TLB as referring to a region of memory comprising a set of pages that correspond to a superpage in response to detecting a superpage enable indicator associated with the entry in the TLB is asserted.

22 Claims, 9 Drawing Sheets

EXTENDED PAGE SIZE USING AGGREGATED SMALL PAGES

BACKGROUND OF THE INVENTION

1. Field of the Invention

This invention relates to computer processors and, more particularly, to page translation in a virtual memory environment.

2. Description of the Related Art

Modern computer systems take advantage of virtual memory to improve performance. For example, in order to make efficient use of memory while taking advantage of the even greater capacity of hard disk storage, processors frequently incorporate a virtual addressing mechanism in which a virtual address may refer to an address space that is much larger than the physical size of memory. The virtual addressing mechanism is commonly performed by a combination of processor hardware and operating system software. In practice, the large virtual address space is usually broken up into pages. Whenever the processor reads or writes to a virtual memory address, specialized processor hardware translates the address into either a physical location on a page (sometimes referred to as a frame) that resides in the physical memory or a reference to a page (or frame) that is stored on disk. If the reference is to a frame stored on disk, the operating system moves that frame into physical memory, swapping out a frame that has not been recently accessed if necessary.

Address translation using paging typically involves a set of data structures known as page translation tables. To translate a virtual address into a physical address, the low-order bits of the virtual address may be mapped directly to the physical address while higher order bits of the virtual address may be used to index into page translation tables to find the higher order bits of the physical address. In a hierarchical page table implementation, a processor may partition the higher order bits of a virtual address into one or more bit-fields, each corresponding to a different level of hierarchy of the page translation tables. Entries in the page translation tables that map virtual addresses to physical addresses may generally be referred to as page table entries (PTEs).

The speed of virtual address translation may be increased by caching PTEs in a CPU cache know as a translation lookaside buffer (TLB). A TLB may have a fixed number of slots for storing PTEs. Since accessing a TLB entry is generally faster than performing an address translation using page translation tables, the size and coverage of the TLB may be an important indicator of overall system performance. Coverage of the TLB depends on the size of the page represented by each TLB entry. Common computer architectures provide only a coarse selection of virtual memory page sizes. For example, the well known x86-64 architecture provides page sizes of 4 KB, 2 MB, and 1 GB. Smaller page sizes reduce the effective capacity of the TLB and increase the miss rate of TLB accesses. Unfortunately, very large pages sizes often result in inefficient allocation of memory for applications that do not require large data sets. In view of the above considerations, systems and methods of improving system performance by improving TLB miss rate and/or increasing TLB effective capacity while maintaining efficient memory usage may be desired.

In addition to the above considerations, while improved TLB miss rate and capacity may provide for certain enhanced capabilities, it may be desirable for processors to be able to continue to run existing software whenever enhanced capabilities are introduced. Accordingly, processor enhancements that continue to support legacy paging modes may be desirable.

SUMMARY OF THE INVENTION

Various embodiments of a processor including a virtual memory paging mechanism are disclosed. The virtual memory paging mechanism enables an operating system operating on the processor to use pages of a first size and a second size. The second size is greater than the first size. The virtual memory paging mechanism further enables the operating system to form superpages comprising a set of pages including two or more contiguous pages of the first size. The size of a superpage is less than the second size. The processor further includes a page table that includes a separate entry for each of the two or more contiguous pages included in each superpage. The virtual memory paging mechanism enables the operating system to access each superpage using a single virtual address. The processor further includes a translation lookaside buffer (TLB). The virtual memory paging mechanism interprets a single entry in the TLB as referring to a region of memory comprising a set of pages that correspond to a superpage in response to detecting a superpage enable indicator associated with the entry in the TLB is asserted. In one embodiment, the size of a superpage is 64 KB.

In one embodiment, in response to detecting the superpage enable indicator associated with the entry in the TLB is asserted, the virtual memory paging mechanism interprets an entry in the page table as referring to a region of memory comprising a portion of a superpage. In a further embodiment, the superpage enable indicator is software-settable. The virtual memory paging mechanism issues a page fault in response to detecting that at least one of the at least two entries in the page table is missing or includes attributes that are not consistent with corresponding attributes in other of the at least two entries in the page table.

In a still further embodiment, the virtual memory paging mechanism simultaneously and independently enables the use of superpages on one or both of a first operating system and a second operating system operating on the processor. In a still further embodiment, the first operating system is a guest operating system in a virtualized environment configured to use a first page table to translate a virtual address in guest address space to a physical address in guest address space and the second operating system is a host operating system in a virtualized environment configured to use a second page table to translate a physical address in guest address space to a physical address in host address space. In a still further embodiment, the virtual memory paging mechanism enables the operating system to use superpages of two or more different superpage sizes. In this embodiment, each superpages size is equal to a size of two or more contiguous, aligned pages of the first size and each superpage size is less than the second size.

These and other embodiments will become apparent upon consideration of the following description and accompanying drawings.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
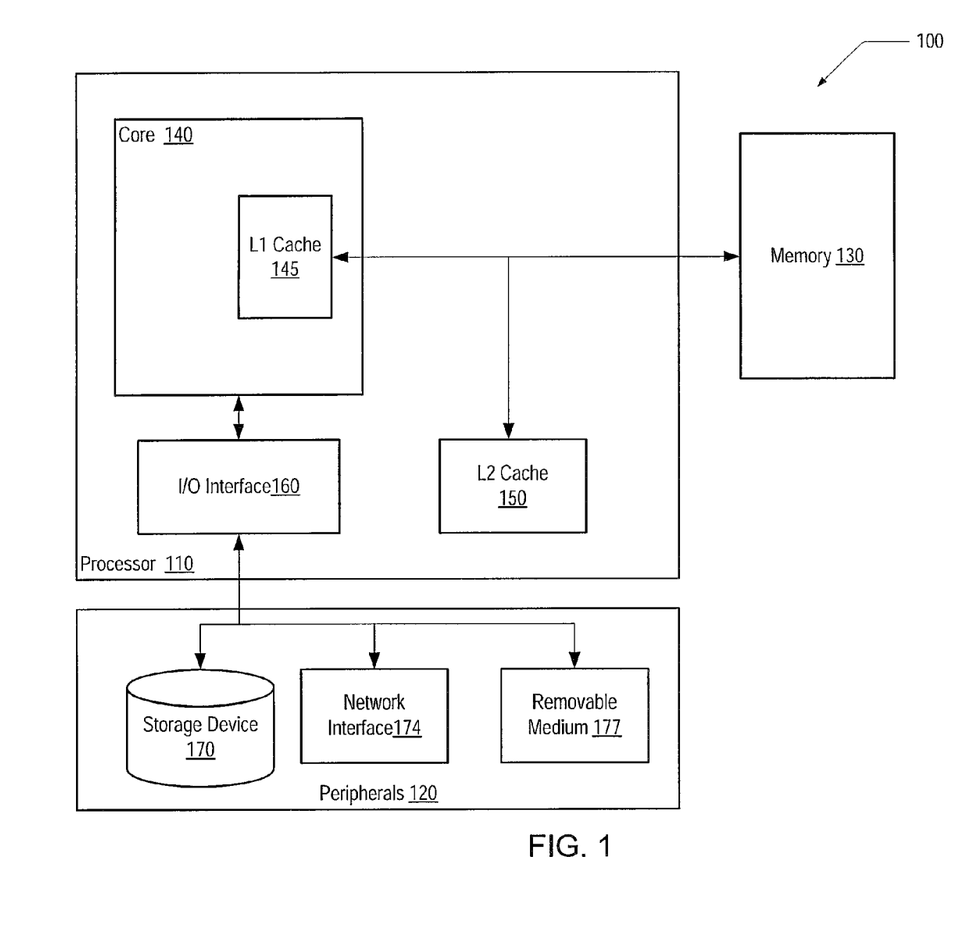
FIG. 1 is a generalized block diagram of one embodiment of a computer system that may incorporate extended page sizes

FIG. 1 is a generalized block diagram of one embodiment of a computer system 100 that may incorporate extended page sizes. A processor 110 is shown coupled to peripherals 120 and a physical memory 130. Peripherals 120 may include a storage device 170, a network interface 174, and removable medium 177. The illustrated embodiment is typical of a general-purpose computer system. However, the illustrated components, particularly processor 110, may be found in a wide variety of apparatus such as a control system, appliance, automobile, consumer electronic product, or indeed any device that incorporates computation and stores or processes data.

Processor 110 is illustrative of any of a variety of processors that may support virtual memory by providing an address translation function. Processor 110 may include one or more cores 140 coupled to I/O interface 160 and to a level-2 (L2) cache 150. Core 140 may include a level-1 (L1) cache 145 coupled to L2 cache 150. Physical memory 130 may typically comprise RAM, but may also be any type of data storage that is coupled to processor 110 and provides relatively quick access to data to processes executing on processor 110. In contrast, storage device 170 may generally store larger amounts of data than physical memory 130, with slower access times. Common storage devices include hard disk, floppy disk, CD, or any other suitable data storage device.

Depending on the intended uses of computer system 100, various other peripherals 120 may be coupled to processor 110 through I/O interface 160. For instance, peripherals 120 may include a keyboard, a monitor, speakers, disk drives, input/output ports, etc. Interconnections between memory 130, peripherals 120, and processor 110 may include address and data buses and may comprise shared buses, a switching fabric, or any other suitable interconnection system for coupling components together in a computer system. In alternative embodiments, computer system 100 may include more than or fewer than two levels of caches.

During operation, when core 140 requires access to a page of data for the first time, the corresponding data may be moved from storage device 170 to memory 130. Core 140 may then move one or more portions of a page (e.g., cache lines) from memory 130 to L1 cache 145. As additional cache lines are needed, they may also be moved to L1 cache 145. If there is not enough space in L1 cache 145, a cache lines may be moved (evicted) to L2 cache 150. Similarly, as L2 cache 150 becomes full, cache lines may be displaced to memory 130 and as memory 130 becomes full, pages may be displaced to storage device 170. Techniques for determining which portion of a page to move when a particular cache becomes full are well known in the art. Each of these techniques may be referred to as a cache replacement policy or a cache algorithm.

Figure 2:
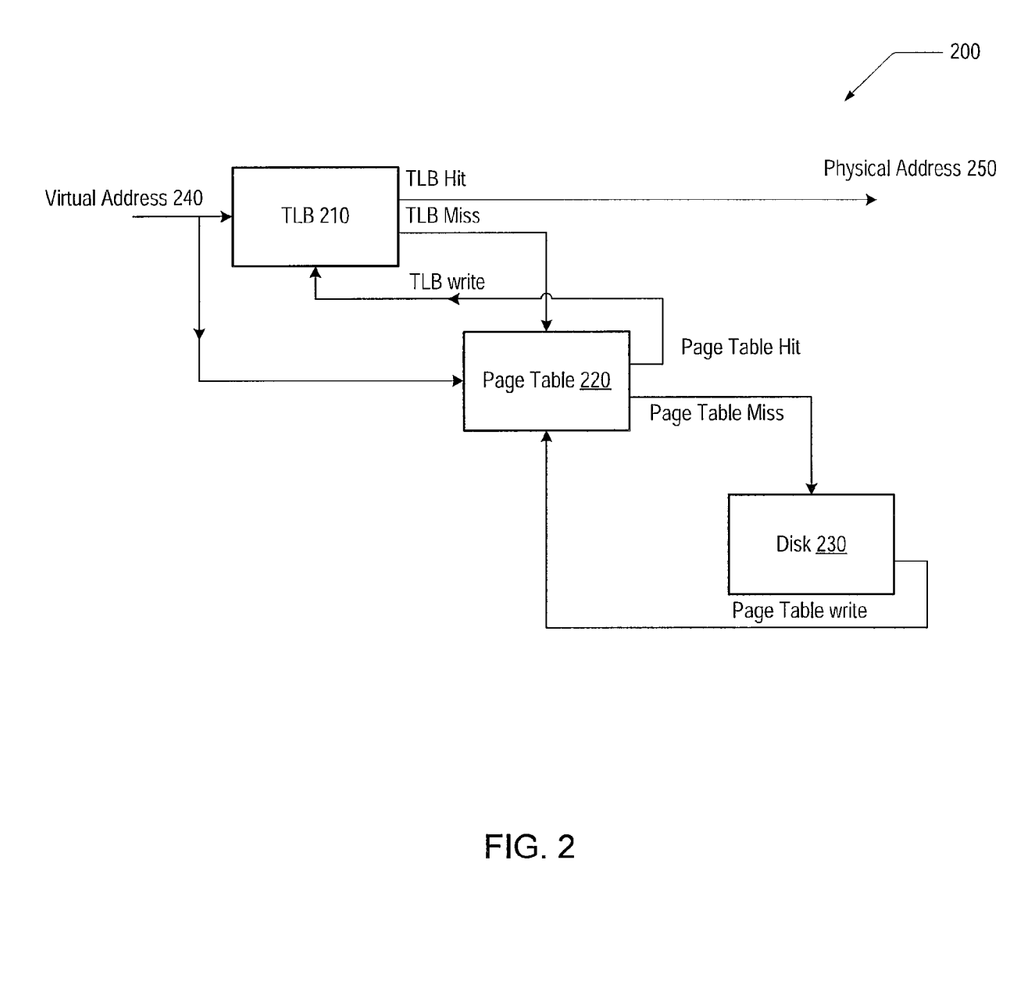
FIG. 2 illustrates one embodiment of an address translation system that may be used in a system by a processor.

FIG. 2 illustrates one embodiment of an address translation system 200 that may be used in system 100 by processor 110. System 200 includes a translation lookaside buffer (TLB) 210, a page table 220, and a disk 230. In one embodiment, TLB 210 and page table 220 may be incorporated into processor 110 and disk 230 may be any of a variety of storage devices similar to storage device 170. During operation, processor 110 may obtain a virtual address 240 for a desired page from a process executing an instruction that reads or writes to a virtual memory location.

Processor 110 may then attempt to identify a physical address that corresponds to virtual address 240 by consulting the entries in TLB 210. If the virtual-to-physical translation is present in TLB 210, referred to as a TLB hit, the physical address 250 including a frame number may be returned to processor 110. If the virtual-to-physical translation is not present in TLB 210, referred to as a TLB miss, processor 110 may then attempt to identify a physical address that corresponds to virtual address 240 by consulting the entries in page table 220. If the virtual-to-physical translation is present in page table 220, referred to as a page table hit, the translation entry may be written to TLB 210. Subsequently, processor 110 may retry the access by consulting the entries in TLB 210, where the desired entry may now be found. If the virtual-to-physical translation is not present in page table 220, referred to as a page table miss, processor 110 may declare a page fault. A page fault may cause the desired page to be retrieved from disk 230 and a corresponding entry to be written to page table 220. After page table 220 has been updated, processor 110 may retry the access by consulting the entries in TLB 210. Since TLB 210 has not yet been updated, a TLB miss will occur. However, processor 110 may then consulting the entries in page table 220 where a page table hit may occur and the translation entry may be written to TLB 210. Subsequently, processor 110 may retry the access by consulting the entries in TLB 210, where the desired entry may now be found. If the desired page cannot be retrieved from disk 230, for example, if the desired access is invalid, then a segmentation fault or other similar error may be declared and handled by software such as the operating system executing on processor 110.

Entries in page table 220 may translate virtual addresses to physical addresses using any of a variety of formats. Generally speaking, a virtual address includes a number of bits fields that are used as an index into page table 220 and a set of low order bits that are used as an offset into the page identified by page table 220. In various embodiments, page table 220 may include one or more levels, each of which is indexed by a particular bit field of the virtual address. Accordingly, the format of the higher-order bit fields in the virtual address depends on the size of the page and the number levels in page table 220. Irrespective of the number of page table levels, page table entries and corresponding TLB entries may be used to translate virtual addresses into physical addresses including a physical frame number.

Processors that support virtual addressing may use virtual addresses of various lengths in a variety of operating modes. Such operating modes may define the way that the operating system and the processor interpret the bit-fields in the virtual address as well as the way that the bit-fields are used in the translation of a virtual address to a physical address. In one embodiment, processor 110 maintains backward compatibility with the operating modes of processors that are compatible with the x86 architecture.

Figure 3:
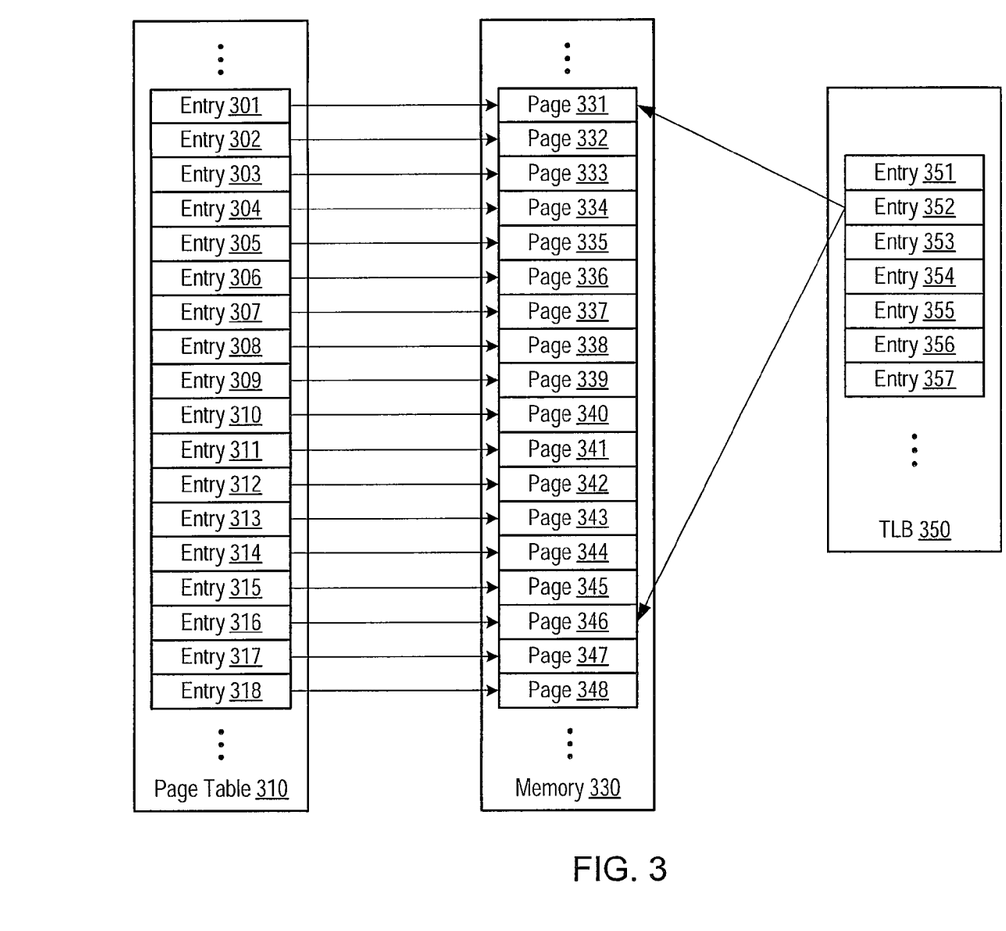
FIG. 3 illustrates one embodiment of a mapping of entries in a page table and entries in a TLB to a memory.

One approach to increasing the coverage of a TLB and reducing the odds of a TLB miss is to increase the size of the pages represented by each entry in the TLB. Processor 110 may be configured to use extended page sizes via control register settings that are described below. FIG. 3 illustrates one embodiment of a mapping of entries in a page table 310 and entries in a TLB 350 to a memory 330. In the illustrated embodiment, page table entries may correspond to 4 KB pages and TLB entries may correspond to larger page sizes, for example, 64 KB pages. Page table 310 may include page table entries 301-318, etc. TLB 350 may include entries 351-357, etc. Memory 330 may include pages 331-348, etc. Each of entries 301-318 may correspond to a 4 KB page. As shown, entry 301 corresponds to page 331, entry 302 corresponds to page 332, and so on. Each of entries 351-357 may correspond to a 64 KB page. For example, as shown, entry 352 corresponds to a region of memory including pages 331-346, which may be referred to as a superpage. Superpages, as used herein, may refer to a region of memory including two or more contiguous, aggregated, aligned, 4 KB pages. In addition, for convenience and without loss of generality, in the discussions that follow, any portion of a physical frame that is located in L1 cache, L2 cache, or memory may be referred to as being in memory in contrast to frames that are located in a storage device. Processor 110 and the operating system that executes thereon may use a variety of data structures to determine whether or not superpages are supported, whether or not superpages are enabled, which TLB entries correspond to small (e.g. 4 KB) pages and which TLB entries correspond to superpages as described below.

Figure 4:
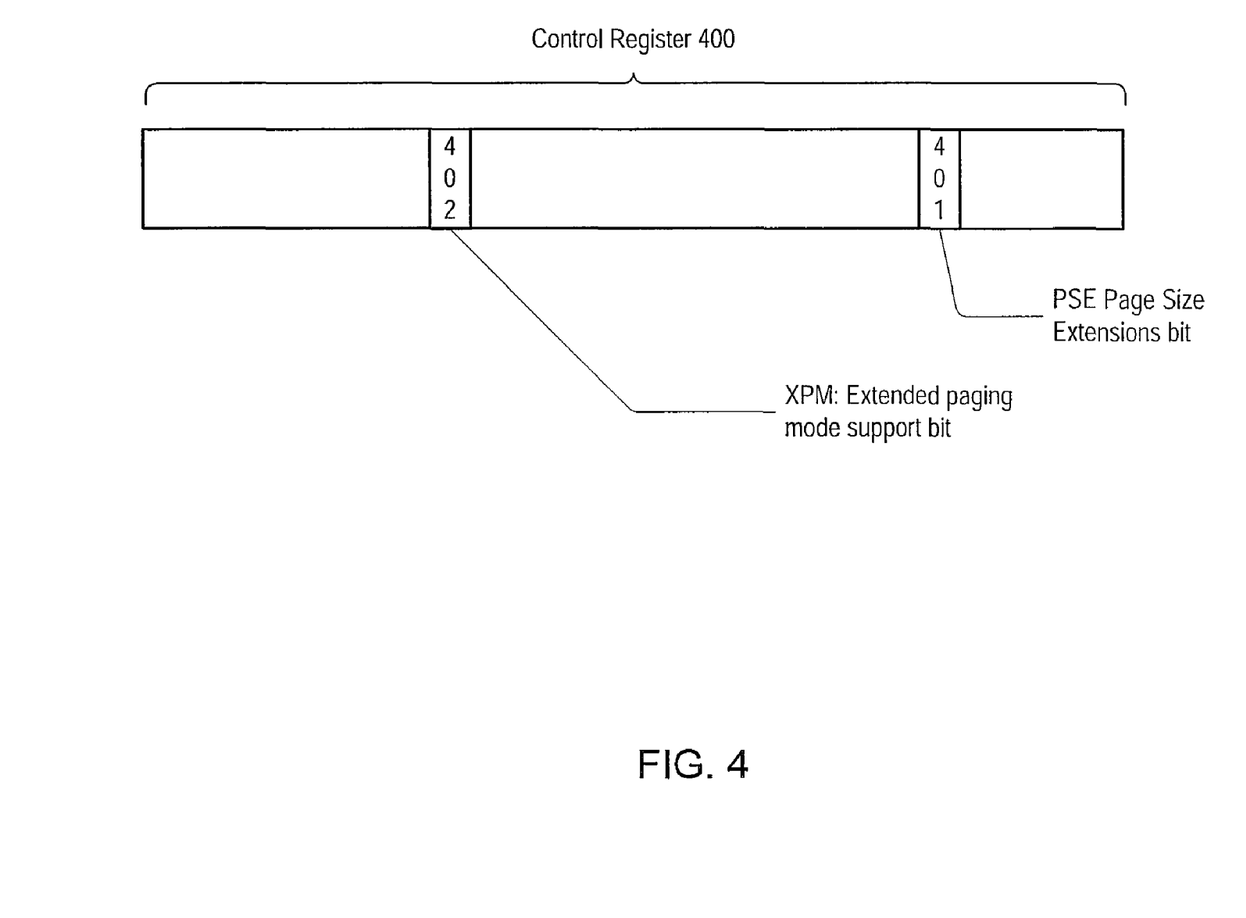
FIG. 4 illustrates one embodiment of the bit-fields contained within a control register that indicate the status of support for extended page sizes.

FIG. 4 illustrates one embodiment of the bit-fields contained within a control register 400 that indicate the status of support for extended page sizes. Control register 400 may correspond to a control register 4 (CR4) in a processor incorporating the x86 architecture. CR4 registers include a number of bits that define the capabilities of a processor. As shown, register 400 includes two bits 401 and 402 that are related to superpages. Bit 401, referred to as the page size extension or PSE bit, indicates whether pages are 4 KB or the standard larger page size of 4 MB, or 2 MB if physical address extension (PAE) is enabled. If bit 401 is not asserted, a page size of 4 KB is enabled. In addition, register 400 includes bit 402, referred to as the extended paging mode (XPM) support bit, which if set indicates that extended mode page sizes are supported.

In one embodiment, processor 110 may support a single extended page size. For example, an extended page size of 64 KB may be supported. In alternative embodiments, more than one extended page size may be supported. A variety of mechanisms may be provided to determine which extended page sizes are supported. The following section illustrates one such mechanism.

Figure 5:
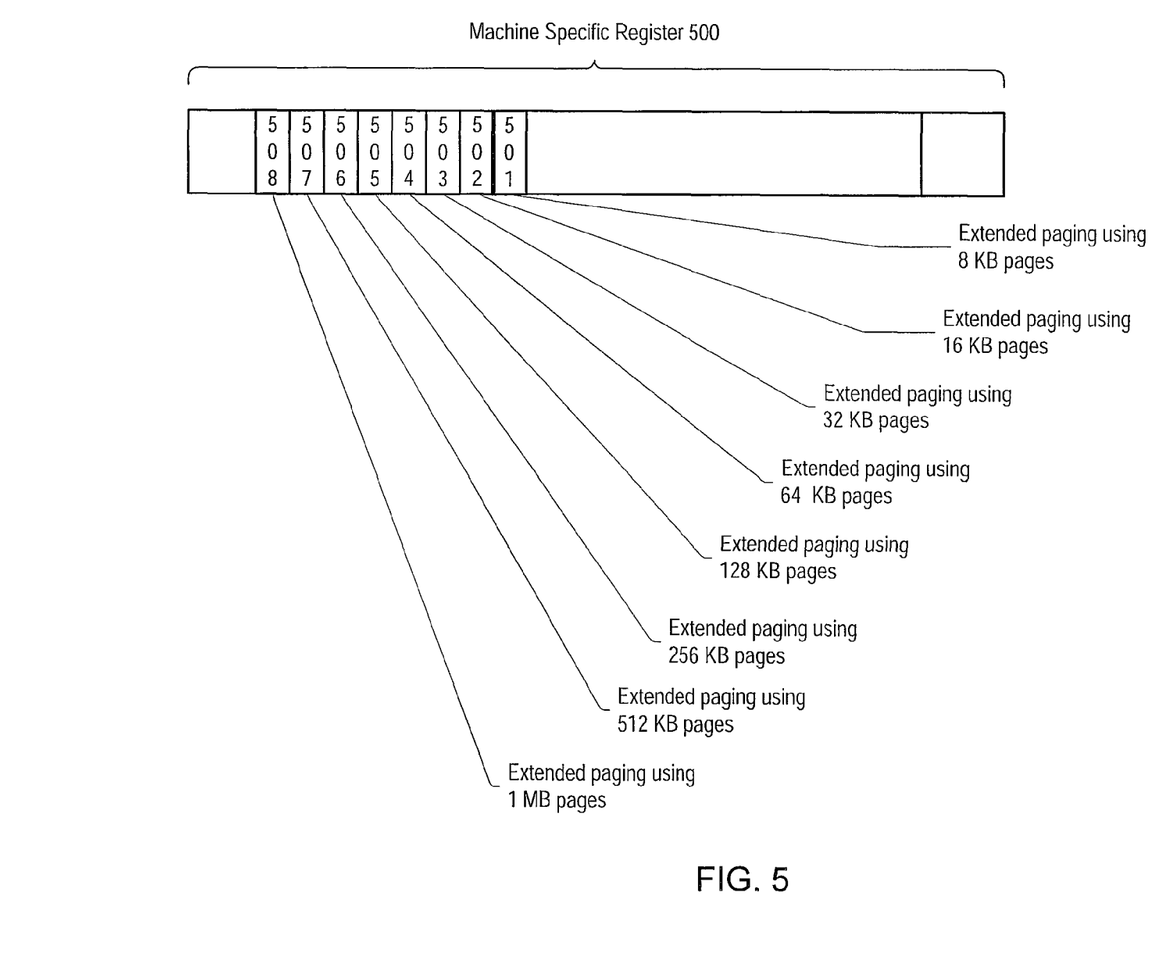
FIG. 5 illustrates one embodiment of the bit-fields contained within a model-specific register (MSR).

FIG. 5 illustrates one embodiment of the bit-fields contained within a model-specific register (MSR) 500. MSR 500 includes a number of bits that define the extended mode page sizes that are supported by a processor. In one embodiment, as shown, register 500 includes bits 501-508. Assuming that extended page sizes are supported as indicated by the values of bits 401 and 402 as described above, the pages sizes that are supported are indicated by values of bits 501-508 as indicated in Table 1.

TABLE 1

| Bit Number | Supported extended page sizes |
| --- | --- |
| 501 | 8 KB |
| 502 | 16 KB |
| 503 | 32 KB |
| 504 | 64 KB |
| 505 | 128 KB |
| 506 | 256 KB |
| 507 | 512 KB |
| 508 | 1 MB |

In one embodiment, register 500 may be a read only register. Accordingly, as shown in Table 1, register 500 indicates that a single selected extended page size is supported. In one embodiment, only one of bits 501-508 may be set indicating which single extended page size is supported. In an alternative embodiment, more than one of bits 501-508 may be set indicating that more than one extended page size is supported. In a still further embodiment, register 500 may be writable, enabling various page sizes to by dynamically enabled and disabled by software.

It is noted that extended paging mode may be enabled separately in the host mode and the guest mode of virtualized machine environment such as Secure Virtual Machines (SVM). For example, when switching between a host operating system and a guest operating system, values of OS-specific versions of registers 400 and 500 may be saved and restored to a data structure know as a virtual machine control block (VMCB).

By checking the values set in registers 400 and 500, software executing on processor 110 may determine what, if any, extended page sizes are supported. Software may then use a number of additional mechanisms to define superpages.

Figure 6:
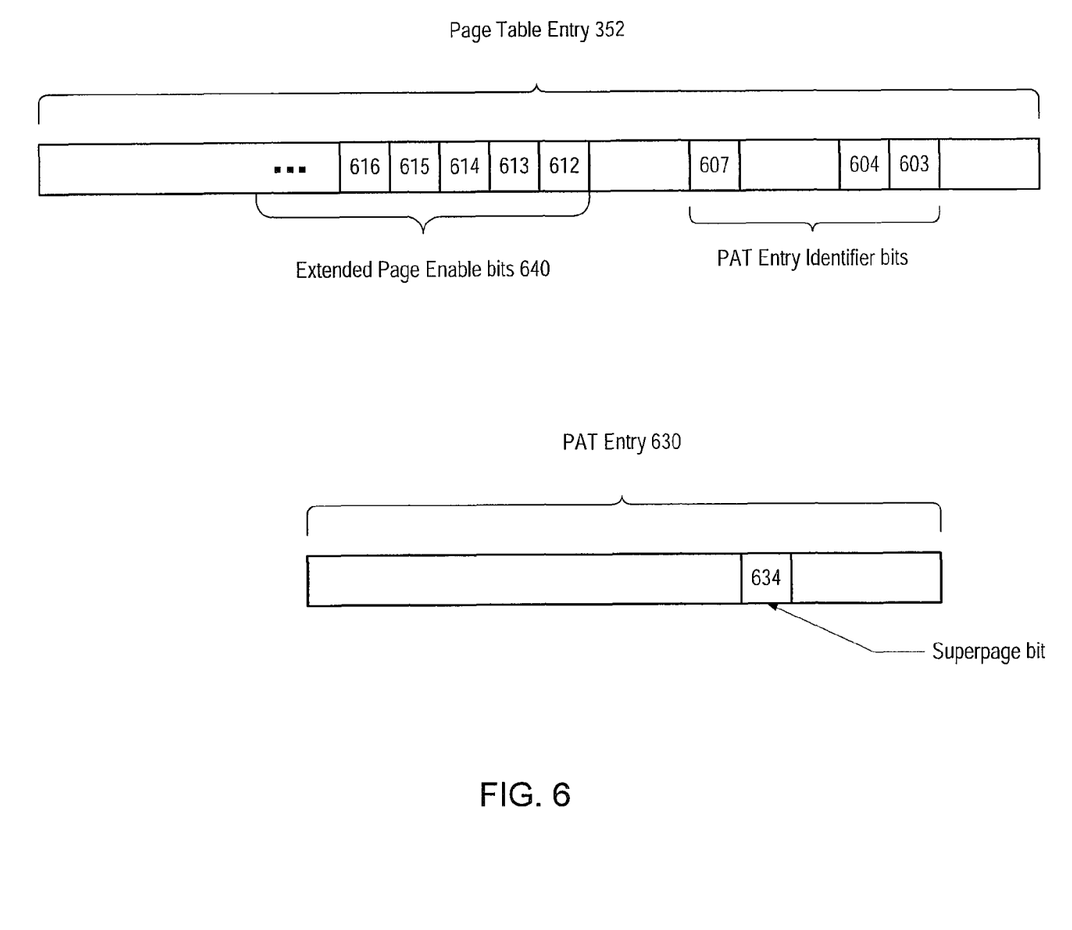
FIG. 6 illustrates one embodiment of data structure entries that may be used by an operating system to define superpages.

FIG. 6 illustrates one embodiment of data structure entries that may be used by an operating system to define superpages. In the figure, a page table entry 352 and a page-attribute-table (PAT) entry 630 are shown. In one embodiment, each entry in a page table includes identifier bits that refer to an entry in the PAT that describes the format of the referring page table entry. For example, page table entry 352 includes bits 603, 604, and 607 that together form an index to a particular entry in the PAT such as, for example, entry 630. In one embodiment, bit 603 may correspond to the page write through (PWT) bit, bit 604 may correspond to the page cache disable (PCD) bit, and bit 607 may correspond to the page attribute table (PAT) bit of the x86 architecture.

Within PAT entry 630, a bit may be designated to indicate whether or not superpages are enabled. For example, as shown in FIG. 6, a superpage bit 634 is shown within PAT entry 630. In one embodiment, if bit 634 is set to '1', a page table entry that references this page attribute entry is part of a superpage group of page table entries and a TLB entry that references this page attribute entry describes a superpage. Otherwise, if bit 634 is not set to '1', a page table entry or a TLB entry that references this page attribute entry describes a 4 KB page.

In an alternative embodiment, instead of using bits 603, 604, and 607 as an index to an entry in the PAT where bit 634 serves as a superpage bit, another bit of page table entry 352 may be used as a superpage bit. For example, one of the AVL bits, such as bit 11 of page table entry 352 or the PAT bit, bit

607, may be used as a superpage bit. If an AVL bit is used, it may be necessary to configure a processor to support XPM to allow hardware to interpret the AVL bit.

Within page table entry 352, a bit field 640 including bits 612-616, etc. is also shown. Bit field 640 may be used to indicate which superpage size is enabled. In one embodiment, bit field 640 values as shown in Table 2 indicate which superpage size is enabled.

TABLE 2

| Supported superpage size | Bits included in bit field 640 | Value of bit field 640 |
|---|---|---|
| 8 KB | 612 | b'0 |
| 16 KB | 612-613 | b'01 |
| 32 KB | 612-614 | b'011 |
| 64 KB | 612-615 | b'0111 |
| 128 KB | 612-616 | b'01111 |
| 256 KB | 612-617 | b'011111 |
| 512 KB | 612-618 | b'0111111 |
| 1 MB | 612-619 | b'01111111 |

Any of bits 612-619 that are not part of bit field 640 may be part of the physical frame number. For example, if 64 KB superpages are enabled, bits 612-615 are reserved as bit field 640 to indicate the superpage size that is enabled while higher order bits 616, 617, etc. are part of the physical frame number. In alternative embodiment, any of a variety of other bits from page table entry 352 may be used by an operating system to define the enabled superpage size(s).

It is noted that in one embodiment, extended paging mode may be defined separately in the host mode and the guest mode of virtualized machine environment such as Secure Virtual Machines (SVM). For example, when switching between a host operating system and a guest operating system, values of OS-specific versions of page tables and page attribute tables may be maintained. It is further noted that in some embodiments that incorporate virtualized machines, a first set of superpages may be used in translating virtual addresses in a guest operating system address space to physical addresses in the guest operating system address space and a second set of superpages may be used in translating physical addresses in a guest operating system address space to physical addresses in the host operating system address space. Page tables used in such systems may be referred to as nested page tables.

As noted above, a superpage comprises two or more contiguous, aggregated, aligned, 4 KB pages. It is further noted that in one embodiment, the operating system that uses superpages may be required to consistently fill a set of page table entries that describe such a set of 4 KB pages to form a superpage region by replicating a superpage entry into each entry of the set. The following consistency requirements apply to this embodiment.

The individual page table entries may be required to adhere to the format described above in order to indicate that they are part of a superpage entry. If processor 110 reads an individual page table entry that does not adhere to the format described above, the superpage may be declared invalid and the page table entry in question may be interpreted as one describing a 4 KB page. The TLB may remove conflicting entries when an inconsistent entry is read. Further, if processor 110 attempts to set an accessed and/or a dirty (A/D) bit in an inconsistent entry, a page fault may be generated.

In a further embodiment, valid superpages may require that a complete set of page table entries be present in the page table according to a set of rules that form a contract between processor 110 and the operating system that executes thereon.

For example, if 64 KB superpages are enabled, there must be sixteen 4 KB page table entries to form a valid superpage. If not, a page fault may occur during a memory access even if the access is directed to a 4 KB page for which a valid page table entry does exist. In a still further embodiment, the physical frame numbers and/or the caching attributes of each individual 4 KB entry comprising the superpage entry may be required to be identical. Otherwise the behavior of the processor 110 may be undefined. In a still further embodiment, the protection attributes of each individual 4 KB entry comprising the superpage entry may be required to be identical. If not, a page fault may occur during a memory access even if the access is directed to a 4 KB page for which a valid page table entry does exist. If the rules described above are followed, an operating system may sequentially upgrade individual page table entries comprising a superpage by ignoring some number of spurious (but otherwise harmless) page faults. In an alternative embodiment, the operating system may take the page table offline during the update process so as to avoid spurious page faults.

In another embodiment, updating the A/D bits of a page table entry may require that the first (i.e. lowest address) entry belonging to a superpage set of entries be updated first. If the first entry does not have the superpage bits set or if other inconsistencies as described above are present, a page fault may occur. In an alternative embodiment, updating the A/D bits of a page table entry may only require that any one of the entries that belong to a superpage set of entries be updated. Such updates, referred to as "sparse" updates, may require the operating system to sequentially scan the entries or perform a logical 'OR' operation on the relevant bits of all of the entries in a set of superpage entries in order to find a valid superpage. Updating a dirty bit in any entry may require that an accessed bit in the entry also be updated at the same time.

Figure 7:
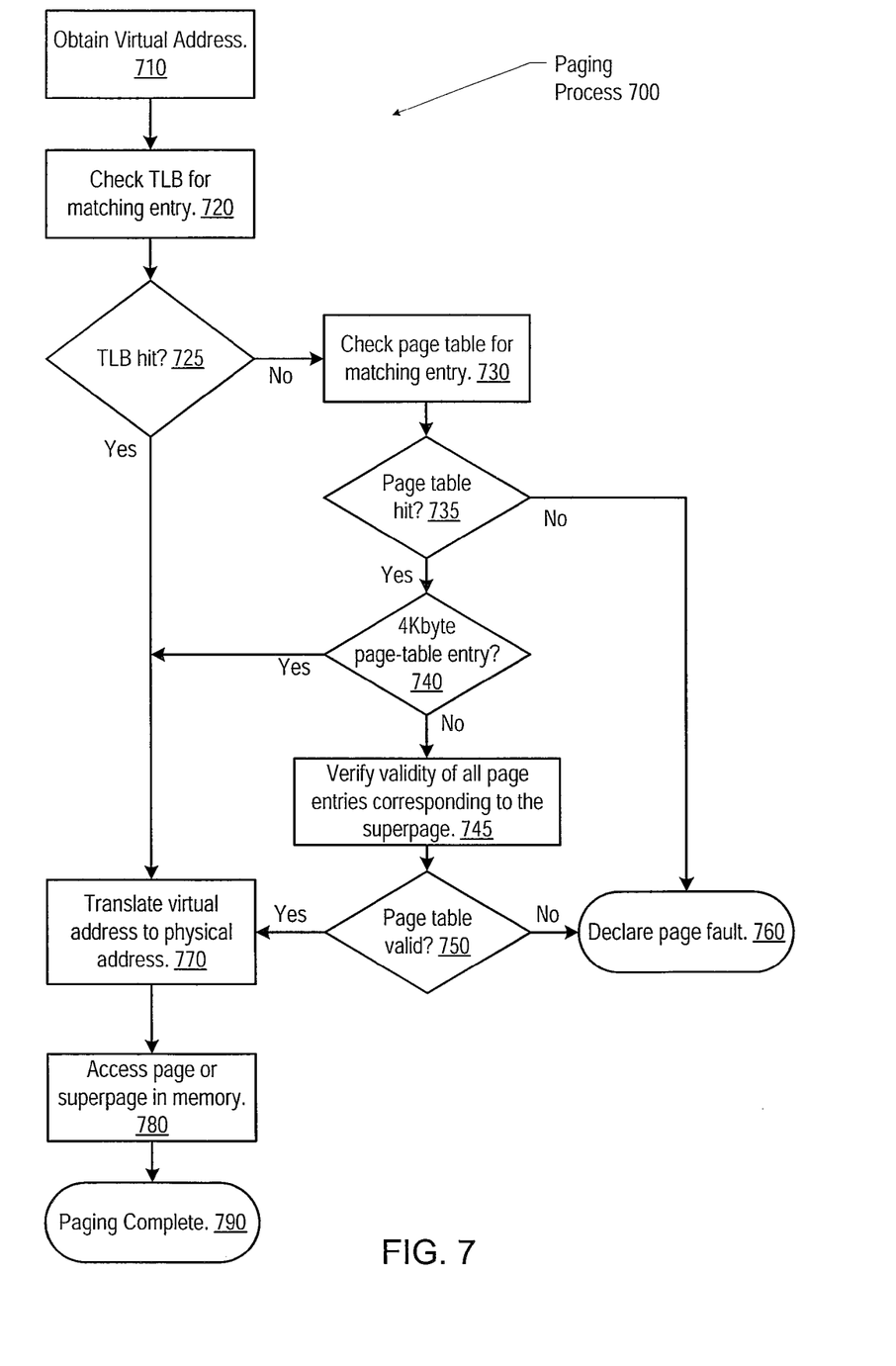
FIG. 7 illustrates one embodiment of a paging process that may be executed by a processor to access a superpage.

FIG. 7 illustrates one embodiment of a paging process 700 that may be executed by processor 110 to access a superpage. Process 700 may begin when a virtual address of a superpage is obtained (block 710). Once a virtual address is available, the TLB may be accessed to check for a matching entry (block 720). If there is a TLB hit (decision block 725), the virtual address may be translated to a physical address (block 770) such as by using the physical frame number found in the TLB and the offset from the virtual address. Once the physical address is known, the corresponding superpage may be accessed in memory (block 780). The paging process is complete at block 790.

If there is a TLB miss (decision block 725), the page table(s) may be accessed to check for a matching entry (block 730). If there is a page table miss (decision block 735), a page fault may be declared (block 760). If there is a page table hit (decision block 735), and the page table entry corresponds to a 4 Kbyte page (decision block 740), process 700 may continue at block 770. If there is a page table hit (decision block 735), and the page table entry does not correspond to a 4 Kbyte page (decision block 740), the validity of the set of page table entries that together correspond to the targeted superpage may be verified (block 745). If the set of page table entries is not valid (decision block 750), a page fault may be declared (block 760). In one embodiment, a page fault may terminate the access request. In other embodiments, depending on the cause of the page fault, the access may continue. For example, under certain circumstances as described above, the access request may be assumed to be a 4 KB page access request. In other circumstances, page faults may be ignored and the superpage access allowed to continue as if the page table entries are valid. If the set of page table entries is valid (decision block 750), the virtual address may be translated to a physical address (block 770) such as by using the physical frame number found in the TLB and the offset from the virtual address. Once the physical address is known, the corresponding superpage may be accessed in memory (block 780). The paging process is complete at block 790.

Figure 8:
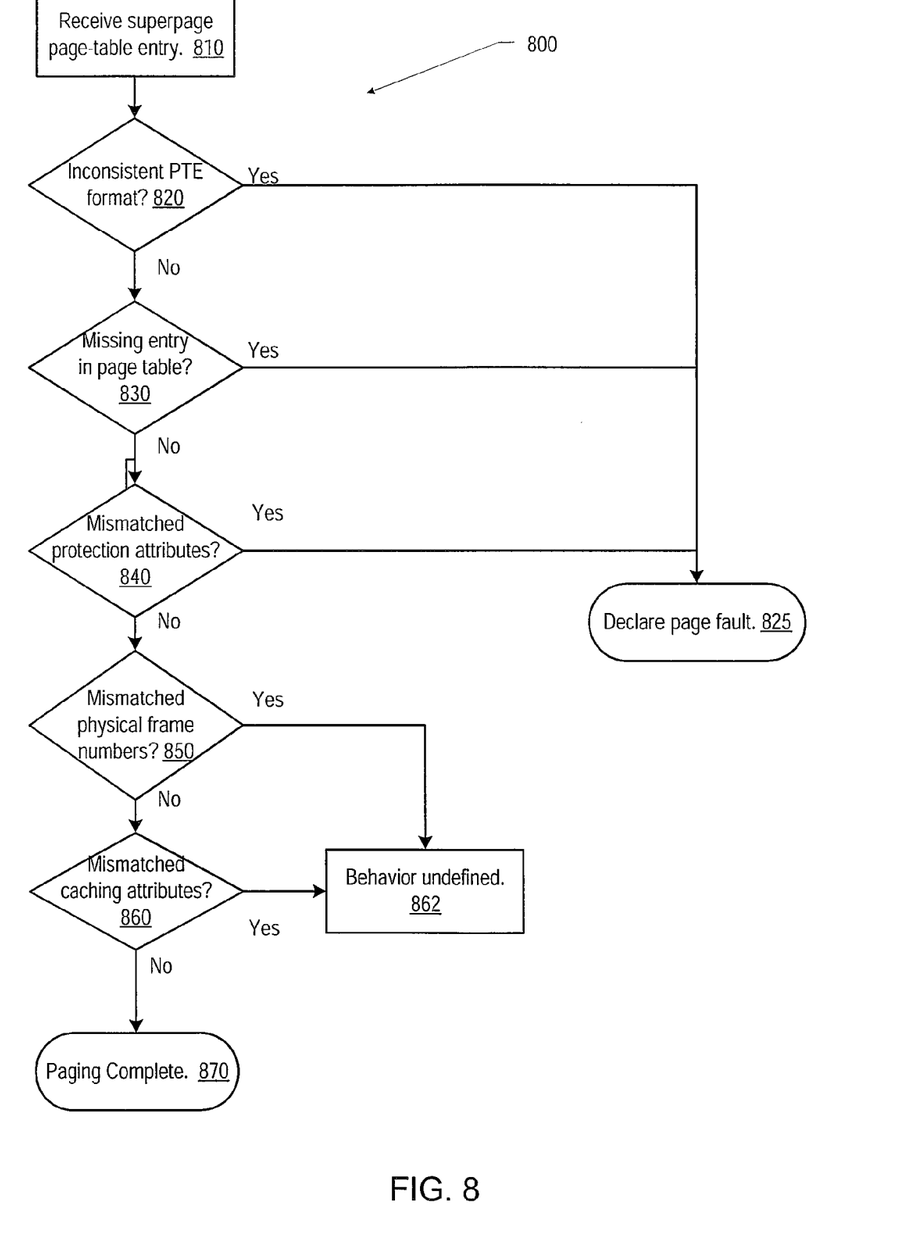
FIG. 8 illustrates one embodiment of a process that may be used to check the validity of a superpage entry read from a page table in a processor that supports superpages.

FIG. 8 illustrates one embodiment of a process 800 that may be used to check the validity of a superpage entry read from a page table in a processor that supports superpages. Process 800 may begin when a superpage page-table entry is received (block 810). The set of superpage entries may be checked for consistency. If the formats of all of the entries in the set are inconsistent (decision block 820), or there is a missing entry in the set (decision block 830), or if the protection attributes of entries in the set of entries are mismatched (decision block 840), a page fault may be declared (block 825).

If the formats of all of the entries in the set are consistent (decision block 820), there are no missing entries in the set (decision block 830), and if the protection attributes of entries in the set of entries are matched (decision block 840), but there are mismatched physical frame numbers in the set of entries (decision block 850) or mismatched caching attributes in the set of entries (decision block 860), paging behavior may be undefined. If there are no mismatched physical frame numbers (decision block 850) or mismatched caching attributes (decision block 860) in the set of entries, the paging process may be completed (block 870).

Figure 9:
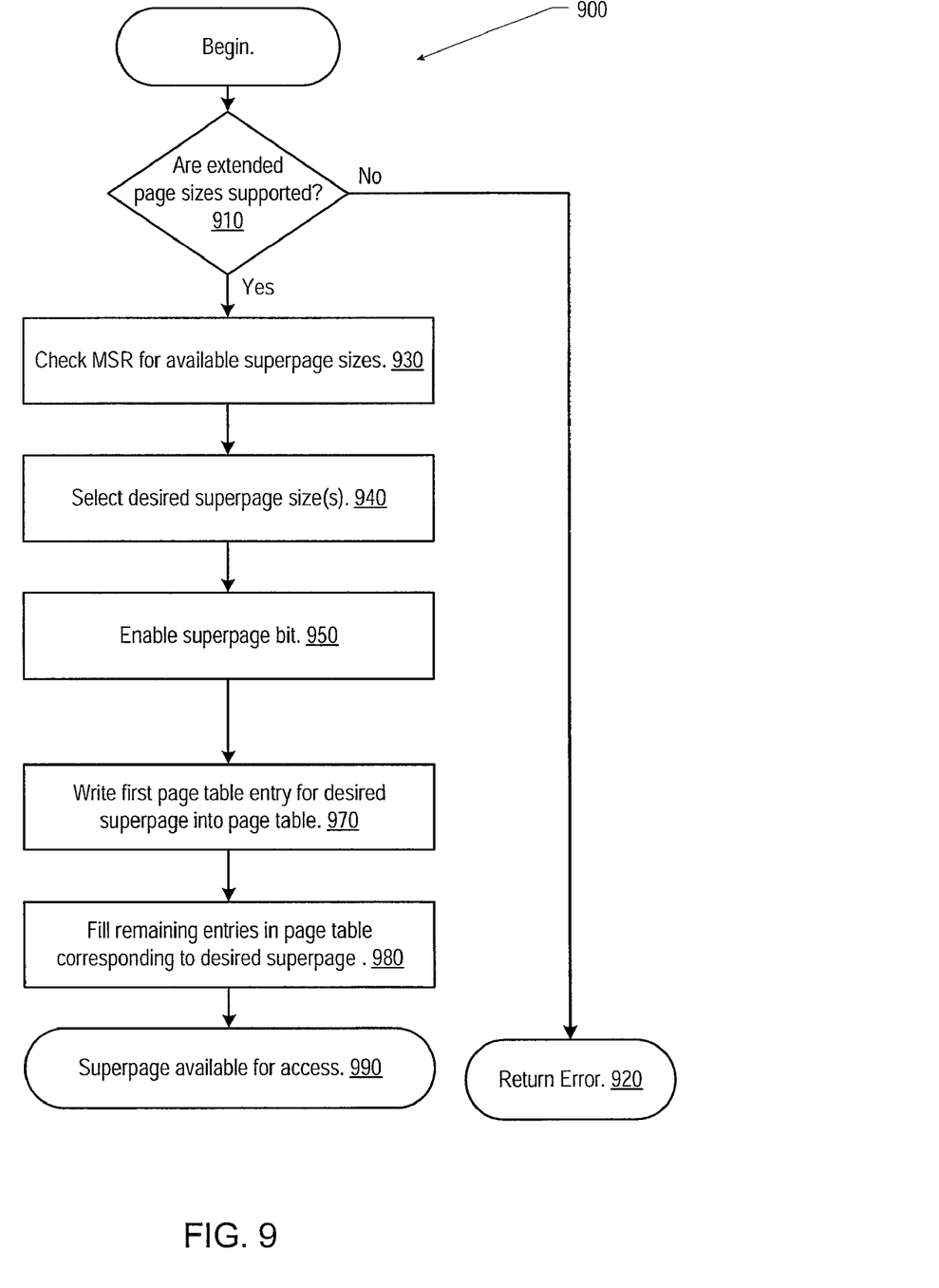
FIG. 9 illustrates one embodiment of a process that may be used to configure a processor to use superpages.

FIG. 9 illustrates one embodiment of a process that may be used to configure a processor to use superpages. Process 900 may begin with a check of processor hardware capabilities to determine if extended page sizes are supported (decision block 910). For example, in one embodiment, a bit in a control status register may indicate whether or not extended page sizes are supported. If extended page sizes are not supported, an error may be returned (block 920). If extended page sizes are supported, another check may be performed to determine what sizes of superpages are supported (block 930). For example, in one embodiment, a bit field in a model-specific register may indicate what extended page sizes are supported. Next, one or more desired pages sizes may be selected (block 940). A superpage indicator may be set by software (block 950). For example, a bit in a page attribute table entry that is used to define the format of page table entries for superpages may be set to a value indicating enablement of superpages. Once superpages are enabled, a first entry of a set of entries that correspond to a superpage may be written into a page table (970). In one embodiment, the format specified by the page attribute table entry described above may be used for the first and subsequent entries in the page table. Next, the remaining entries of the set of entries that correspond to a superpage may be written into the page table (block 980). One a consistent set of entries that correspond to a contiguous, aligned set of 4 KB pages has been written into the page table, a corresponding superpage is available for access (block 990), completing process 900.

It is noted that the foregoing flow charts are for purposes of discussion only. In alternative embodiments, the elements depicted in the flow charts may occur in a different order, or in some cases concurrently. Additionally, some of the flow chart elements may not be present in various embodiments, or may be combined with other elements. All such alternatives are contemplated.

It is noted that the above-described embodiments may comprise software. In such an embodiment, the program instructions, which implement the methods and/or mechanisms, may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
a virtual memory paging mechanism, wherein the virtual memory paging mechanism is configured to enable an operating system operating on the processor to:
use pages of a first size and pages of a second size, the second size being greater than the first size;
form superpages comprising a set of pages including two or more contiguous pages of the first size, wherein a size of a superpage is less than the second size; and
a page table that includes a separate page table entry for each of the two or more contiguous pages included in each superpage.

2. The processor of claim 1, wherein the virtual memory paging mechanism is further configured to enable the operating system operating on the processor to access each superpage using a single virtual address.

3. The processor of claim 2, further comprising a translation lookaside buffer (TLB), wherein the virtual memory paging mechanism is configured to interpret a single entry in the TLB as referring to a region of memory comprising a set of pages that correspond to a superpage in response to detecting a superpage enable indicator associated with the entry in the TLB is asserted.

4. The processor of claim 3, wherein the virtual memory paging mechanism is further configured to interpret an entry in the page table as referring to a region of memory comprising a portion of a superpage, in response to detecting a superpage enable indicator associated with the entry in the page table is asserted.

5. The processor of claim 3, wherein the superpage enable indicator is software-settable.

6. The processor of claim 2, wherein the virtual memory paging mechanism is further configured to issue a page fault in response to detecting that at least one of the at least two entries in the page table is missing or includes attributes that are not consistent with corresponding attributes in other of the at least two entries in the page table.

7. The processor of claim 1, wherein the size of a superpage is 64 KB.

8. The processor of claim 1, wherein the virtual memory paging mechanism is further configured to simultaneously and independently enable the use of superpages on one or both of a first operating system and a second operating system operating on the processor.

9. The processor of claim 8, wherein the first operating system is a guest operating system in a virtualized environment configured to use a first page table to translate a virtual address in guest address space to a physical address in guest address space and the second operating system is a host operating system in a virtualized environment configured to use a second page table to translate a physical address in guest address space to a physical address in host address space.

10. The processor of claim 1, wherein the virtual memory paging mechanism is further configured to enable the operating system to use superpages of two or more different superpage sizes, wherein each superpages size is equal to a size of two or more contiguous, aligned pages of the first size and wherein each superpage size is less than the second size.

11. The processor of claim 1, further comprising a register comprising one or more bits, each of the one or more bits indicating an extended mode page size supported by the processor.

12. A method for virtual memory paging in a processor, the method comprising:
    enabling an operating system operating on the processor to use pages of a first size and pages of a second size, the second size being greater than the first size; and
    enabling the operating system to form superpages comprising a set of pages including two or more contiguous pages of the first size, wherein a size of a superpage is less than the second size; and
    including a separate page table entry in a page table for each of the two or more contiguous pages included in each superpage.

13. The method of claim 12, further comprising enabling the operating system operating on the processor to access each superpage using a single virtual address.

14. The method of claim 13, further comprising interpreting a single entry in a TLB as referring to a region of memory comprising a set of pages that correspond to a superpage in response to detecting a superpage enable indicator associated with the entry in the TLB is asserted.

15. The method of claim 14, further comprising interpreting an entry in the page table as referring to a region of memory comprising a portion of a superpage in response to detecting a superpage enable indicator associated with the entry in the page table is asserted.

16. The method of claim 14, wherein the superpage enable indicator is software-settable.

17. The method of claim 13, further comprising issuing a page fault in response to detecting that at least one of the at least two entries in the page table is missing or includes attributes that are not consistent with corresponding attributes in other of the at least two entries in the page table.

18. The method of claim 12, wherein the size of a superpage is 64 KB.

19. The method of claim 12, further comprising simultaneously and independently enabling the use of superpages on one or both of a first operating system and a second operating system operating on the processor.

20. The method of claim 19, wherein the first operating system is a guest operating system in a virtualized environment configured to use a first page table to translate a virtual address in guest address space to a physical address in guest address space and the second operating system is a host operating system in a virtualized environment configured to use a second page table to translate a physical address in guest address space to a physical address in host address space.

21. The method of claim 12, further comprising enabling the operating system to use superpages of two or more different superpage sizes, wherein each superpages size is equal to a size of two or more contiguous, aligned pages of the first size and wherein each superpage size is less than the second size.

22. The method of claim 12, further comprising maintaining a register comprising one or more bits, each of the one or more bits indicating an extended mode page size supported by the processor.

* * * * *